US011121598B2

(12) United States Patent
Kamata et al.

(10) Patent No.: US 11,121,598 B2
(45) Date of Patent: Sep. 14, 2021

(54) ROTOR OF ROTATING ELECTRICAL MACHINE

(71) Applicant: HONDA MOTOR CO., LTD., Tokyo (JP)

(72) Inventors: Tsuyoshi Kamata, Saitama (JP); Yoshihisa Kubota, Saitama (JP); Shingo Soma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 16/675,675

(22) Filed: Nov. 6, 2019

(65) Prior Publication Data

US 2020/0153301 A1     May 14, 2020

(30) Foreign Application Priority Data

Nov. 8, 2018   (JP) .............................. JP2018-210745

(51) Int. Cl.
*H02K 1/32*         (2006.01)
*H02K 1/27*         (2006.01)

(52) U.S. Cl.
CPC ............... *H02K 1/32* (2013.01); *H02K 1/276* (2013.01)

(58) Field of Classification Search
CPC ........ H02K 1/276; H02K 1/32; H02K 1/2766; H02K 2213/03
USPC .......................................................... 310/61
See application file for complete search history.

(56) References Cited

U.S. PATENT DOCUMENTS

| 2012/0200188 | A1* | 8/2012 | Sano | H02K 1/2766 310/156.38 |
| 2013/0113325 | A1* | 5/2013 | Saito | H02K 1/2706 310/156.12 |
| 2013/0307363 | A1* | 11/2013 | Sano | H02K 1/27 310/156.01 |
| 2015/0001981 | A1* | 1/2015 | Hattori | H02K 1/2766 310/156.53 |
| 2015/0372548 | A1* | 12/2015 | Nigo | H02K 1/2773 310/156.01 |
| 2016/0181877 | A1* | 6/2016 | Ishikawa | F25B 1/04 310/156.08 |

(Continued)

FOREIGN PATENT DOCUMENTS

JP     H09-233744 A        9/1997
JP     2017192221 A    *   10/2017

*Primary Examiner* — Alex W Mok
(74) *Attorney, Agent, or Firm* — Paratus Law Group, PLLC

(57) ABSTRACT

A rotor of a rotating electrical machine includes a rotor core, a plurality of magnetic pole portions arranged along a circumferential direction, and a plurality of arc magnets constituting the magnetic pole portions. Each magnetic pole portion includes a magnet portion of at least two layers along a radial direction. In front view, the rotor core includes an outer diameter side magnet insertion hole, an inner diameter side magnet insertion hole, and a refrigerant flow path hole provided between an outer diameter side magnet portion and an inner diameter side magnet portion to overlap a d-axis. A minimum width of a magnetic path formed between the outer diameter side magnet insertion hole and the refrigerant flow path hole is equal to or larger than a minimum width of a magnetic path formed between the outer diameter side magnet insertion hole and the inner diameter side magnet insertion hole.

9 Claims, 3 Drawing Sheets

(56) References Cited

U.S. PATENT DOCUMENTS

2016/0211709 A1* 7/2016 Tsuchida .................. H02K 1/27
2017/0110944 A1* 4/2017 Nigo ........................ H02K 1/02
2018/0145552 A1* 5/2018 Hattori ................. H02K 1/2766
2018/0183286 A1* 6/2018 Nakano ................. H02K 1/274

* cited by examiner

ROTOR OF ROTATING ELECTRICAL MACHINE

CROSS-REFERENCE TO RELATED APPLICATIONS

This application is based on and claims priority under 35 USC 119 from Japanese Patent Application No. 2018-210745 filed on Nov. 8, 2018.

TECHNICAL FIELD

The present invention relates to a rotor of a rotating electrical machine mounted on an electric vehicle or the like, and particularly relates to a rotor of a rotating electrical machine including a plurality of arc magnets.

BACKGROUND ART

In a related art, a rotor in which a plurality of permanent magnets are arranged at predetermined intervals in a circumferential direction inside a rotor core has been known as a rotor used in a rotating electrical machine. In such a rotor of a rotating electrical machine, some rotors have a magnetic pole portion in which an arc magnet located on an outer diameter side of the rotor and an arc magnet located on an inner diameter side of the rotor are arranged in two layers at an interval. For example, JP-A-1997-233744 discloses a rotor of a rotating electrical machine having a magnetic pole portion in which an outer diameter side arc magnet located on an outer diameter side of the rotor and an inner diameter side arc magnet located on an inner diameter side of the rotor have substantially the same plate thickness and are arranged substantially concentrically. In the rotor of the rotating electric machine of JP-A-1997-233744, since the arc magnets are arranged in two layers in the radial direction, the amount of magnets is increased as compared with a rotor in which an arc magnet is arranged in only one layer, and thus, the magnet torque can be increased.

In recent years, a rotating electric machine with higher output is required in a hybrid vehicle and an EV vehicle in which a rotating electric machine is used as a drive source. However, with the increase in the output of the rotating electrical machine, the temperature rise of a permanent magnet, which greatly affects the performance of the rotating electrical machine, has become a problem. Therefore, a method for efficiently cooling the magnetic pole portion while improving the output performance of a rotating electrical machine is sought.

SUMMARY

An aspect of the invention provides a rotor of a rotating electrical machine which can cool a magnetic pole portion while improving the output performance of the rotating electrical machine.

An embodiment of the present invention relates to a rotor of a rotating electrical machine comprising a rotor core, a plurality of magnetic pole portions arranged along a circumferential direction, and a plurality of arc magnets constituting the magnetic pole portions, each magnetic pole portion includes a magnet portion of at least two layers along a radial direction, the magnet portion includes an outer diameter side magnet portion constituted of at least one said arc magnet arranged to protrude inward in a radial direction, and an inner diameter side magnet portion constituted of at least a pair of said arc magnets arranged to protrude inward in the radial direction, when a central axis of each of the magnetic pole portions is set as a d-axis and an axis separated by 90° in electrical angle from the d-axis is set as a q-axis, in front view, the rotor core includes an outer diameter side magnet insertion hole into which the at least one arc magnet constituting the outer diameter side magnet portion is inserted, an inner diameter side magnet insertion hole into which the at least one pair of arc magnets constituting the inner diameter side magnet portion is inserted, and a refrigerant flow path hole provided between the outer diameter side magnet portion and the inner diameter side magnet portion to overlap the d-axis, and a minimum width of a magnetic path formed between the outer diameter side magnet insertion hole and the refrigerant flow path hole is equal to or larger than a minimum width of a magnetic path formed between the outer diameter side magnet insertion hole and the inner diameter side magnet insertion hole According to the above embodiment of the invention, a magnetic pole portion can be cooled while improving the output performance of the rotating electrical machine.

DESCRIPTION OF EMBODIMENTS

Hereinafter, an embodiment of a rotor of the rotating electrical machine according to the invention will be described with reference to the accompanying drawings.

Figure 1:
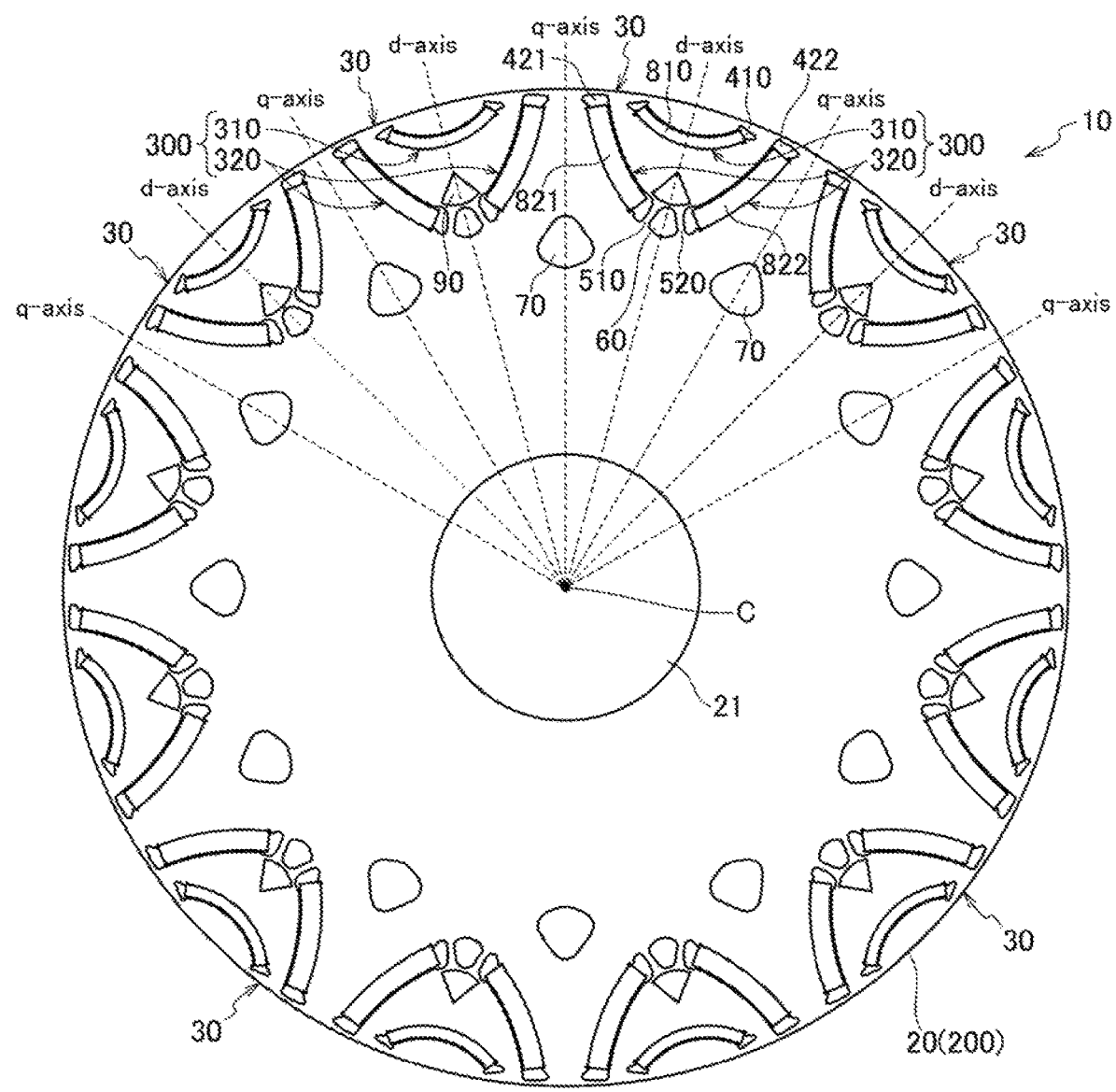
FIG. 1 is a front view of a rotor of the rotating electrical machine according to an embodiment of the invention.

As illustrated in FIG. 1, a rotor 10 of a rotating electrical machine of the embodiment includes a rotor core 20 attached to an outer peripheral portion of a rotor shaft (not illustrated) and a plurality (twelve in the embodiment) of magnetic pole portions 30 formed at predetermined intervals in a circumferential direction inside the rotor core 20. The rotor 10 is disposed on the inner peripheral side of a stator (not illustrated).

The rotor core 20 is formed by laminating a plurality of substantially annular electromagnetic steel plates 200 having the same shape in an axial direction. The rotor core 20 includes a rotor shaft hole 21 which is concentric with an annular ring center C and a first refrigerant passage hole 70 which is formed between adjacent magnetic pole portions 30. When a center axis of each magnetic pole portion 30 connecting the annular ring center C and the center of each magnetic pole portion 30 is set as a d-axis (d-axis in the drawings) and an axis separated from the d-axis by an electrical angle of 90° is set as a q-axis (q-axis in the drawings), corresponding to each magnetic pole portion 30, the rotor core 20 includes an outer diameter side magnet insertion hole 410 formed on the outer diameter side of the rotor core 20 so as to cross the d-axis, a pair of inner diameter side magnet insertion holes 421 and 422 formed in a substantially V shape spreading outward in a radial direction across the d-axis on the inner diameter side of the outer diameter side magnet insertion hole 410, a pair of ribs 510 and 520 formed at the d-axis side end portions of the inner diameter side magnet insertion holes 421 and 422 and extending respectively in the radial direction, a gap portion 60 formed between the pair of ribs 510 and 520, and a second refrigerant flow path hole 90 provided between the pair of inner diameter side magnet insertion holes 421 and 422 and the outer diameter side magnet insertion hole 410 so as to overlap the d-axis. Each of the outer diameter side magnet insertion hole 410 and the inner diameter side magnet insertion holes 421 and 422 has an arc shape which is convex radially inward.

Each magnetic pole portion 30 has a magnet portion 300 including an outer diameter side magnet portion 310 and an inner diameter side magnet portion 320. The outer diameter side magnet portion 310 is configured by an outer diameter side arc magnet 810 which is inserted into the outer diameter side magnet insertion hole 410 and disposed so as to protrude radially inward. The inner diameter side magnet part 320 is configured by a pair of inner diameter side arc magnets 821 and 822 which are respectively inserted into a pair of inner diameter side magnet insertion holes 421 and 422 and disposed so as to protrude radially inward.

The outer diameter side arc magnet 810 and the pair of inner diameter side arc magnets 821 and 822 are magnetized in the radial direction. Also, the outer diameter side arc magnet 810 and the pair of inner diameter side arc magnets 821 and 822 are arranged to be different from the adjacent magnetic pole portion 30 in the magnetization direction and the magnetization direction of the magnetic pole portion 30 is alternately different in the circumferential direction.

Here, in the front view of the rotor 10, the annular ring center C is viewed as downward and the outer diameter side in the d-axis direction is viewed as upward, the pair of inner diameter side magnet insertion holes 421 and 422 are arranged such that a first inner diameter side magnet insertion hole 421 is located on the left side and a second inner diameter side magnet insertion hole 422 is located on the right side with respect to the d-axis. Further, the pair of ribs 510 and 520 are arranged such that a first rib 510 is located on the left side and a second rib 520 is located on the right side with the d-axis interposed therebetween, and the pair of inner diameter side arc magnets 821 and 822 are arranged such that a first inner diameter side arc magnet 821 is located on the left side and a second inner diameter side arc magnet 822 is located on the right side with the d-axis interposed therebetween.

Furthermore, the outer diameter side magnet portion 310, the inner diameter side magnet portion 320, the gap portion 60, and the second refrigerant flow path hole 90 are arranged symmetrically about the d-axis. Accordingly, an efficient arrangement can be made for obtaining reluctance torque.

Figure 2:
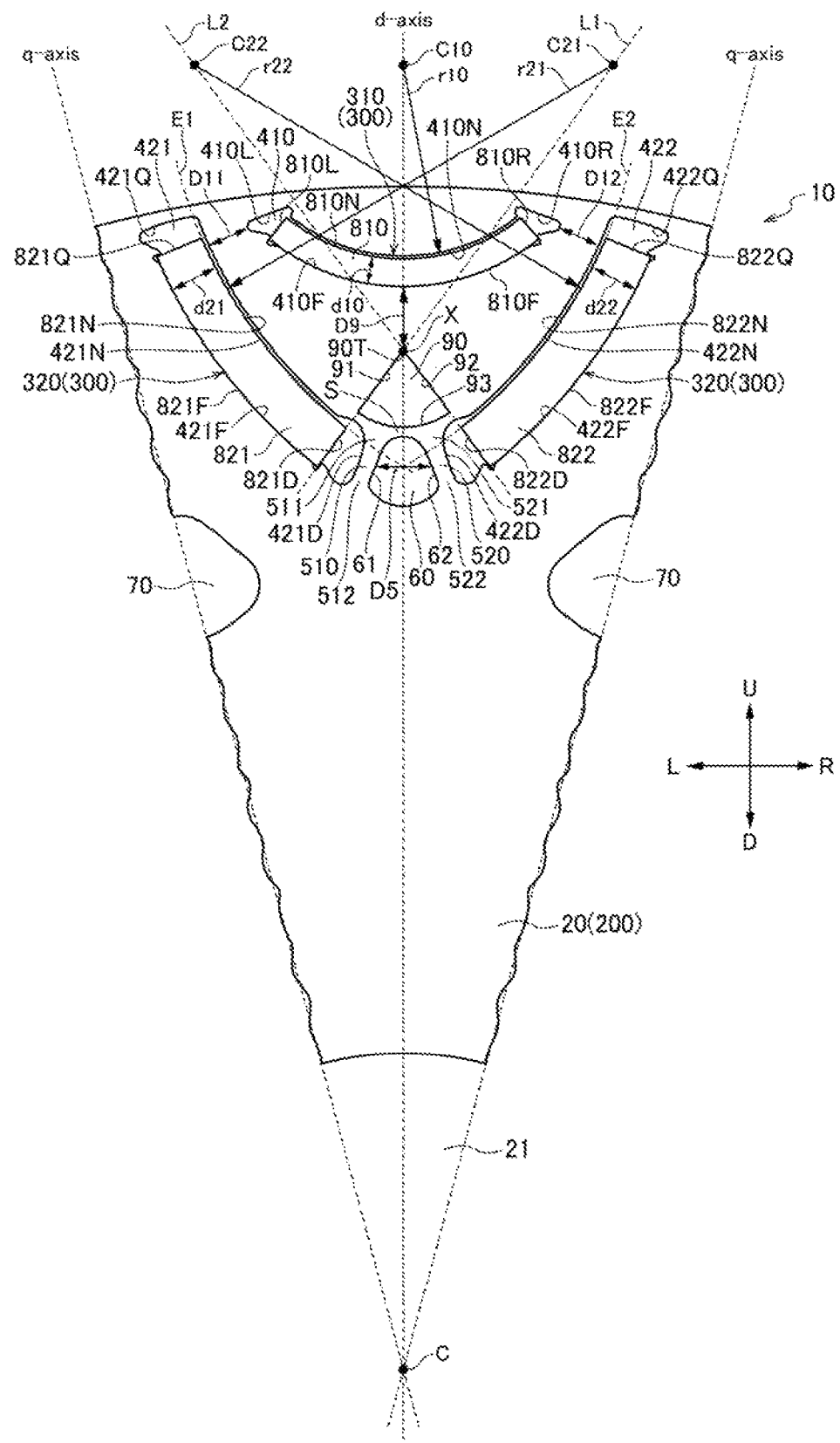
FIG. 2 is an enlarged view around a magnetic pole portion of the rotor of the rotating electrical machine of FIG. 1.
Figure 3:
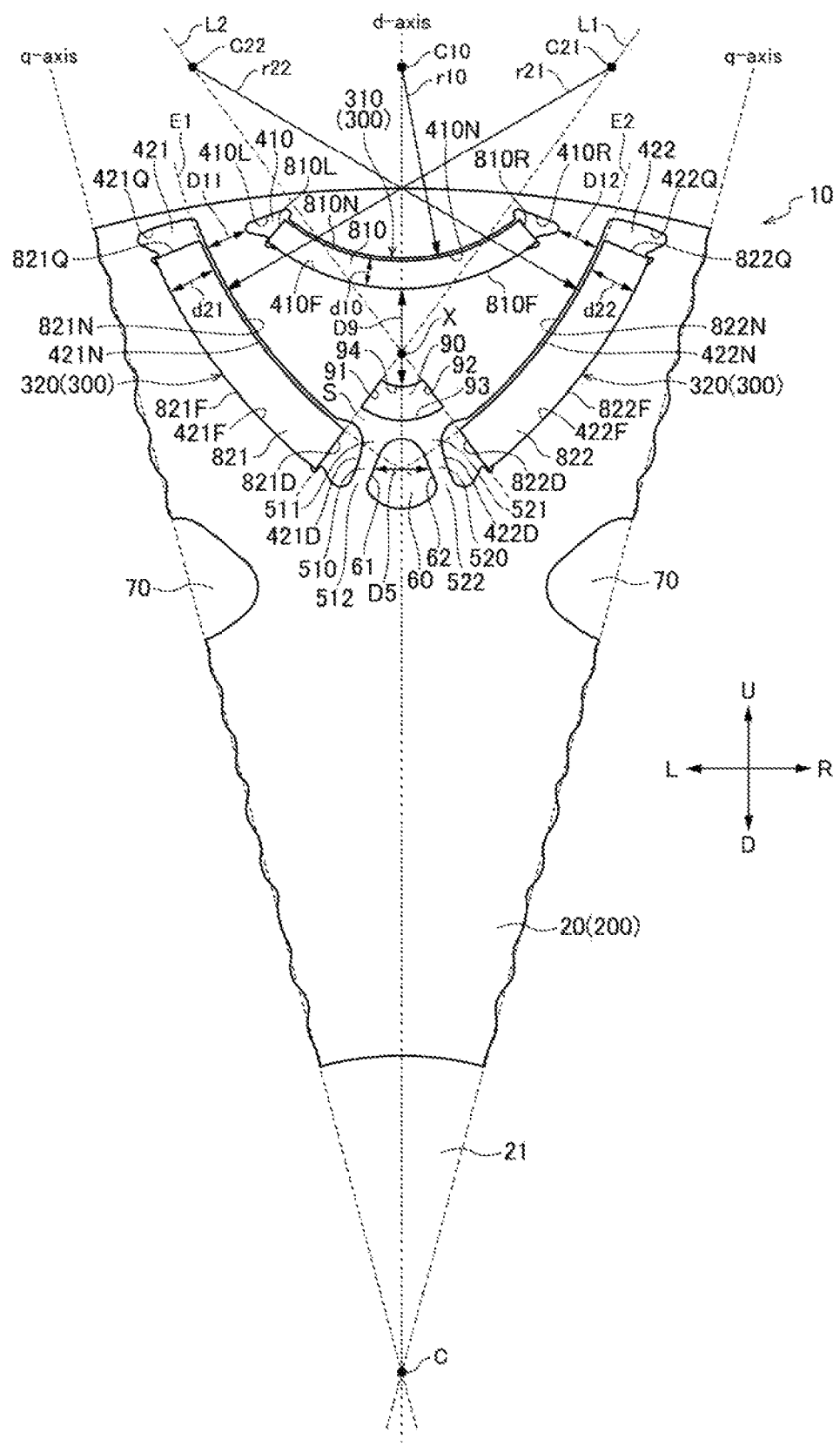
FIG. 3 is a view illustrating a modification example of the rotor of the rotating electrical machine according to the embodiment of the invention.

Hereinafter, in order to simplify and clarify the description in the specification and the like, the description will be made by defining the annular ring center C as the lower side and the outer diameter side in the d-axis direction as the upper side in the front view of the rotor 10. In FIGS. 2 and 3, the upper side of the rotor 10 is indicated as U, the lower side as D, the left side as L, and the right side as R.

As illustrated in FIG. 2, the outer diameter side arc magnet 810 has an inner peripheral surface 810N and an outer peripheral surface 810F having the same arc center C10, a left end surface 810L, and a right end surface 810R. The first inner diameter side arc magnet 821 has an inner peripheral surface 821N and an outer peripheral surface 821F having the same arc center C21, a q-axis side end surface 821Q, and a d-axis side end surface 821D. The arc center C21 of the first inner diameter side arc magnet 821 is located on the right side opposite to the first inner diameter side arc magnet 821 with respect to the d axis. The second inner diameter side arc magnet 822 has an inner peripheral surface 822N and an outer peripheral surface 822F having the same arc center C22, a q-axis side end surface 822Q, and a d-axis side end surface 822D. The arc center C22 of the second inner diameter side arc magnet 822 is located on the left side opposite to the second inner diameter side arc magnet 822 with respect to the d-axis.

Here, the arc center C10 of the outer diameter side arc magnet 810 is located on the d-axis. As a result, since the outer diameter side magnet portion 310 can be constituted by one arc magnet having an arc center on the d-axis, a magnet torque can be efficiently obtained with a simple structure.

Furthermore, the intersection X between a first virtual line L1 connecting the d-axis side end surface 821D of the first inner diameter side arc magnet 821 and the arc center C21 of the first inner diameter side arc magnet 821 and a second virtual line L2 connecting the d-axis side end surface 822D of the second inner diameter side arc magnet 822 and the arc center C22 of the second inner diameter side arc magnet 822 is located on the d-axis between the outer diameter side magnet portion 310 and the inner diameter side magnet portion 320.

The outer diameter side arc magnet 810, the first inner diameter side arc magnet 821, and the second inner diameter side arc magnet 822 may use, for example, arc magnets obtained by cutting a ring-shaped magnet formed by molding using a hot working process in the radial direction.

In general, when forming a ring-shaped magnet by molding using a hot working process such as hot extrusion molding, by hot extrusion molding, a radial stress acts on the crystal group of the ring-shaped magnet material that has been randomly oriented, and thus the crystal group of the ring-shaped magnet material is oriented in the same direction as the stress direction. As a result, an anisotropic ring-shaped magnet oriented in the radial direction is obtained.

Therefore, in order to obtain a ring-shaped magnet having high-performance magnetization characteristics, it is desirable that the stress acting on the crystal group of the ring-shaped magnet material be uniform over the entire region. However, when the ring radius of the ring-shaped magnet material is small and the thickness of the ring-shaped magnet material is large, the stress acting on the crystal group of the ring-shaped magnet material becomes non-uniform and the degree of orientation of the ring-shaped magnet is lowered. Further, even when the thickness of the ring-shaped magnet material is not uniform, the stress acting on the crystal group of the ring-shaped magnet material becomes non-uniform, and thus the degree of orientation of the ring-shaped magnet is lowered. Therefore, in order for the stress acting on the crystal group of the ring-shaped magnet material to be uniform throughout the region, the value of the thickness of the ring-shaped magnet material (the ring radius of the ring-shaped magnet material) needs to be within a predetermined range. Further, when increasing the magnet amount of the arc magnets, in order to arrange arc magnets having high-performance magnetization characteristics in a plurality of layers, it is necessary to increase the arc radius of the arc magnet according to the plate thickness.

A plate thickness d21 of the first inner diameter side arc magnet 821 and a plate thickness d22 of the second inner diameter side arc magnet 822 are larger than a plate thickness d10 of the outer diameter side arc magnet 810. Accordingly, since the magnet amount of the first inner diameter side arc magnet 821 and the second inner diameter side arc magnet 822 can be increased and the magnet torque of the rotating electrical machine can be increased, the output performance of the rotating electrical machine can be improved.

Further, by the extent of the increase in the thickness d21 of the first inner diameter side arc magnet 821 and the thickness d22 of the second inner diameter side arc magnet 822, an arc radius r21 of the inner peripheral surface 821N of the first inner diameter side arc magnet 821 and an arc radius r22 of the inner peripheral surface 822N of the second inner diameter side arc magnet 822 are larger than an arc radius r10 of the inner peripheral surface 810N of the outer diameter side arc magnet 810. As a result, the outer diameter side arc magnet 810, the first inner diameter side arc magnet 821, and the second inner diameter side arc magnet 822 having high-performance magnetization characteristics can be used, accordingly the output performance of the rotating electrical machine can be improved.

Here, d10/r10 which is a ratio of the arc radius r10 of the inner peripheral surface 810N of the outer diameter side arc magnet 810 and the plate thickness d10 of the outer diameter side arc magnet 810, d21/r21 which is a ratio of an arc radius r21 of the inner peripheral surface 821N of the first inner diameter side arc magnet 821 and the plate thickness d21 of the first inner diameter side arc magnet 821, and d22/r22 which is a ratio of the arc radius r22 of the inner peripheral surface 822N of the second inner diameter side arc magnet 822 and the plate thickness d22 of the second inner diameter side arc magnet 822 are preferably substantially the same value within a predetermined range. More preferably, the arc radius r21 of the inner peripheral surface 821N of the first inner diameter side arc magnet 821 is the same as the arc radius r22 of the inner peripheral surface 822N of the second inner diameter side arc magnet 822 and the plate thickness d21 of the first inner diameter side arc magnet 821 and the plate thickness d22 of the second inner diameter side arc magnet 822 are the same, and further the first inner diameter side arc magnet 821 and the second inner diameter side arc magnet 822 have the same shape.

Further, the distance between the first inner diameter side arc magnet 821 and the outer diameter side arc magnet 810 and the distance between the second inner diameter side arc magnet 822 and the outer diameter side arc magnet 810 both increase as it approaches from the q-axis to the d-axis.

Accordingly, since the circumferential length of the magnetic pole portion 30 can be suppressed from becoming large, the rotor 10 can be suppressed from being increased in size. Therefore, when increasing the magnet amount of the first inner diameter side arc magnet 821 and the second inner diameter side arc magnet 822, the rotor 10 can use the outer diameter side arc magnet 810, the first inner diameter side arc magnet 821, and the second inner diameter side arc magnet 822 having high-performance magnetization characteristics while suppressing an increase in size. In addition, since the magnetic path (hereinafter, also referred to as a q-axis magnetic path) along the q-axis in the rotor 10 can be widened and the reluctance torque of the rotating electrical machine can be increased, the output performance of the rotating electrical machine can be improved. Furthermore, the magnetic flux generated by the first inner diameter side arc magnet 821, the second inner diameter side arc magnet 822, and the outer diameter side arc magnet 810 is easily concentrated on the d-axis. Therefore, the magnet torque of the rotating electrical machine can be used efficiently, and thus the output performance of the rotating electrical machine can be improved.

The outer diameter side magnet insertion hole 410 has an inner peripheral wall surface 410N and an outer peripheral wall surface 410F which are formed along the inner peripheral surface 810N and the outer peripheral surface 810F of the outer diameter side arc magnet 810, a left wall surface 410L and a right wall surface 410R. The first inner diameter side magnet insertion hole 421 has an inner peripheral wall surface 421N and an outer peripheral wall surface 421F which are formed along the inner peripheral surface 821N and the outer peripheral surface 821F of the first inner diameter side arc magnet 821, a q-axis side wall surface 421Q and a d-axis side wall surface 421D. The second inner diameter side magnet insertion hole 422 has an inner peripheral wall surface 422N and an outer peripheral wall surface 422F which are formed along the inner peripheral surface 822N and the outer peripheral surface 822F of the second inner diameter side arc magnet 822, a q-axis side wall surface 422Q and a d-axis side wall surface 422D.

The second refrigerant flow path hole 90 is provided between the outer diameter side magnet portion 310 and the inner diameter side magnet portion 320 so as to overlap the d-axis.

Thus, since the second refrigerant flow path hole 90 causes a gap to be disposed on the d-axis between the outer diameter side magnet portion 310 and the inner diameter side magnet portion 320, the d-axis inductance can be reduced.

Further, in the second refrigerant flow path hole 90, a minimum width D9 of the magnetic path formed between the outer diameter side magnet insertion hole 410 and the second refrigerant flow path hole 90 is arranged to be larger than a minimum width D11 of the magnetic path formed between the outer diameter side magnet insertion hole 410 and the first inner diameter side magnet insertion hole 421 and a minimum width D12 of the magnetic path formed between the outer diameter side magnet insertion hole 410 and the second inner diameter side magnet insertion hole 422.

Thus, the q-axis magnetic path in the rotor 10 is not narrowed by the second refrigerant flow path hole 90 and a decrease in the q-axis inductance can be suppressed.

Therefore, since the second refrigerant flow path hole 90 can reduce the d-axis inductance while suppressing the decrease in the q-axis inductance, the reluctance torque can be effectively used, and thus the output performance of the rotating electrical machine can be improved.

Furthermore, since the second refrigerant flow path hole 90 can supply the refrigerant between the outer diameter side magnet portion 310 and the inner diameter side magnet portion 320, the outer diameter side magnet portion 310 and the inner diameter side magnet portion 320 which are heating elements can be cooled.

The second refrigerant flow path hole 90 is provided in a region S which is surrounded by the first virtual line L1, the second virtual line L2, an arc-shaped first extension line E1 extending along the inner peripheral surface 821N of the first inner diameter side arc magnet 821, and an arc-shaped second extension line E2 extending along the inner peripheral surface 822N of the second inner diameter side arc magnet 822.

Thus, without narrowing the magnetic path of the magnetic flux by the first inner diameter side arc magnet 821 and the second inner diameter side arc magnet 822, the second refrigerant flow path hole 90 is disposed between the outer diameter side magnet portion 310 and the inner diameter side magnet portion 320. Therefore, the second refrigerant flow path hole 90 can be provided between the outer diameter side magnet portion 310 and the inner diameter side magnet portion 320 without lowering the output performance of the rotating electrical machine.

In the embodiment, the second refrigerant flow path hole 90 has an outer diameter side apex portion 90T located at the intersection X of the first virtual line L1 and the second virtual line L2, a first side wall portion 91 extending radially inward from the outer diameter side apex portion 90T along the first virtual line L1, a second side wall portion 92 extending radially inward from the outer diameter side apex portion 90T along the second virtual line, and an inner diameter side wall portion 93 extending in a circumferential direction from a radially inner end portion of the first side wall portion 91 to a radially inner end portion of the second side wall portion 92.

Thus, the outer diameter side apex portion 90T of the second refrigerant flow path hole 90 is located at the intersection X of the first virtual line L1 and the second virtual line L2, within the range where the magnetic path of the magnetic flux by the first inner diameter side arc magnet 821 and the second inner diameter side arc magnet 822 is not narrowed, the second refrigerant flow path hole 90 can be arranged on the outermost radial side. Therefore, since, within the range not narrowing the magnetic path of the magnetic flux by the first inner diameter side arc magnet 821 and the second inner diameter side arc magnet 822, the refrigerant can be supplied to the outermost radial side between the outer diameter side magnet portion 310 and the inner diameter side magnet portion 320, the outer diameter side magnet portion 310 which is particularly difficult to cool can be cooled more effectively.

Furthermore, since the first side wall portion 91 extends along the first virtual line L1 and the second side wall portion 92 extends along the second virtual line L2, the second refrigerant flow path hole 90 can make the circumferential length of the second refrigerant flow path hole 90 the longest in the range in which the magnetic path of the magnetic flux by the first inner diameter side arc magnet 821 and the second inner diameter side arc magnet 822 is not narrowed. Further, due to the second refrigerant flow path hole 90, the outer circumferential side in the vicinity of the d-axis side end surface 821D of the first inner diameter side arc magnet 821 and the outer circumferential side in the vicinity of the d-axis side end surface 822D of the second inner diameter side arc magnet 822 become gaps, the sneak magnetic flux in the vicinity of the d-axis side end surface 821D of the first inner diameter side arc magnet 821 and the sneak magnetic flux in the vicinity of the d-axis side end surface 822D of the second inner diameter side arc magnet 822 can be reduced.

Further, the first rib 510 extending in the radial direction is formed between the d-axis side end surface 821D of the first inner diameter side arc magnet 821 and the d-axis and the second rib 520 extending in the radial direction is formed between the d-axis side end surface 822D of the second inner diameter side arc magnet 822 and the d-axis. Further, the gap portion 60 is provided between the first rib 510 and the second rib 520. Therefore, the gap portion 60 is provided to overlap the d-axis.

As a result, in the inner diameter side magnet portion 320, since the gap is provided on the d-axis, the d-axis inductance can be reduced. Therefore, since the difference between the d-axis inductance and the q-axis inductance can be increased, the reluctance torque can be used effectively, and thus the output performance of the rotating electrical machine can be improved.

The first rib 510 is constituted by the d-axis side wall surface 421D of the first inner diameter side magnet insertion hole 421 and a left wall surface 61 of the gap portion 60. The second rib 520 is constituted by the d-axis side wall surface 422D of the second inner diameter side magnet insertion hole 422 and a right side wall surface 62 of the gap portion 60.

Accordingly, the first rib 510 receives the centrifugal load by the first inner diameter side arc magnet 821 and the second rib 520 receives the centrifugal load by the second inner diameter side arc magnet 822. That is, the first rib 510 and the second rib 520 respectively receive the centrifugal load by the first inner diameter side arc magnet 821 and the centrifugal load by the second inner diameter side arc magnet 822. As a result, the bending stress generated in the rotor core 20 due to the weight variation of the first inner diameter side arc magnet 821 and the second inner diameter side arc magnet 822 can be reduced.

Furthermore, the first rib 510 and the second rib 520 are provided in a substantially V shape in which a distance D5 between the first rib 510 and the second rib 520 increases toward the inside in the radial direction. Therefore, since all of a radially outer end portion 511 and a radially inner end portion 512 of the first rib 510 and a radially outer end portion 521 and a radially inner end portion 522 of the second rib 520 can increase an angle R, stress concentration at both radial end portions of the first rib 510 and the second rib 520 can be alleviated.

Here, the gap portion 60 may be supplied with a refrigerant. Accordingly, since the refrigerant can be supplied to the vicinities of the outer diameter side arc magnet 810, the first inner diameter side arc magnet 821, and the second inner diameter side arc magnet 822, the outer diameter side arc magnet 810, the first inner diameter side arc magnet 821, and the second inner diameter side arc magnet 822 can be cooled more effectively.

As illustrated in FIG. 3, the second refrigerant flow path hole 90 may have the first side wall portion 91 extending radially inward along the first virtual line L1, the second side wall portion 92 extending radially inward along the second virtual line, the inner diameter side wall portion 93 extending in the circumferential direction from the radially inner end portion of the first side wall portion 91 to the radially inner end portion of the second side wall portion 92, and an outer diameter side wall portion 94 extending in an arc shape from the radial outer end portion of the first side wall portion 91 to the radial outer end portion of the second side wall portion 92 to protrude toward the radial inner side.

As a result, due to manufacturing errors of the rotor core 20, even when the width of the q-axis magnetic path formed between the outer diameter side magnet insertion hole 410 and the first inner diameter side magnet insertion hole 421 or the width of the q-axis magnetic path formed between the outer diameter side magnet insertion hole 410 and the second inner diameter side magnet insertion hole 422 is increased, it is possible to prevent the q-axis inductance from decreasing. Further, the stress concentration on the radially outer side of the second refrigerant flow path hole 90 due to the centrifugal force during the rotation of the rotor 10 can be alleviated.

The embodiment described above can be modified, improved, and the like as appropriate.

In addition, at least the following matters are described in the specification. Although the components or the like which correspond to those of the embodiment described above are shown in parenthesis, the invention is not limited thereto.

(1) A rotor (rotor 10) of a rotating electrical machine including a rotor core (rotor core 20), a plurality of magnetic pole portions (magnetic pole portions 30) arranged along a circumferential direction, and a plurality of arc magnets (outer diameter side arc magnet 810, and inner diameter side arc magnets 821, 822) constituting the magnetic pole portions, where each magnetic pole portion includes a magnet portion (magnet portion 300) of at least two layers along a radial direction, the magnet portion includes an outer diameter side magnet portion (outer diameter side magnet portion 310) constituted of at least one said arc magnet (outer diameter side arc magnet 810) arranged to protrude inward in a radial direction, and an inner diameter side magnet portion (inner diameter side magnet portion 320) constituted of at least a pair of said arc magnets (inner diameter side arc magnets 821, 822) arranged to protrude inward in the radial direction, when a central axis of each of the magnetic pole portions is set as a d-axis and an axis separated by 90° in electrical angle from the d-axis is set as a q-axis, in front view, the rotor core includes an outer diameter side magnet insertion hole (outer diameter side magnet insertion hole 410) into which the at least one arc magnet constituting the outer diameter side magnet portion is inserted, an inner diameter side magnet insertion hole (inner diameter side magnet insertion holes 421, 422) into which the at least one pair of arc magnets constituting the inner diameter side magnet portion is inserted, and a refrigerant flow path hole (second refrigerant flow path hole 90) provided between the outer diameter side magnet portion and the inner diameter side magnet portion to overlap the d-axis, and a minimum width (minimum width D9) of a magnetic path formed between the outer diameter side magnet insertion hole and the refrigerant flow path hole is equal to or larger than a minimum width (minimum widths D11, and D12) of a magnetic path formed between the outer diameter side magnet insertion hole and the inner diameter side magnet insertion hole.

According to (1), since the refrigerant flow path hole is provided between the outer diameter side magnet portion and the inner diameter side magnet portion, the refrigerant can be supplied between the outer diameter side magnet portion and the inner diameter side magnet portion, and thus the magnetic pole portion can be cooled.

Further, since each magnetic pole portion includes at least two layers of magnet portions along the radial direction, the number of magnets in each magnetic pole portion can be increased and thus, the magnet torque of the rotating electrical machine can be increased.

Furthermore, since the refrigerant flow path hole is provided to overlap the d-axis, the rotor core has a gap on the d-axis between the outer diameter side magnet portion and the inner diameter side magnet portion, and thus the d-axis inductance can be reduced. On the other hand, since the minimum width of the magnetic path formed between the outer diameter side magnet insertion hole and the refrigerant flow path hole is larger than the minimum width of the magnetic path formed between the outer diameter side magnet insertion hole and the inner diameter side magnet insertion hole, the q-axis magnetic path in the rotor is not narrowed by the refrigerant flow path hole, and thus a decrease in the q-axis inductance can be suppressed. Therefore, since the refrigerant flow path hole can reduce the d-axis inductance while suppressing the decrease in the q-axis inductance, the reluctance torque can be effectively used, and thus the output performance of the rotating electrical machine can be improved.

(2) In the rotor of the rotating electrical machine according to (1), the pair of arc magnets of the inner diameter side magnet portion includes a first arc magnet (first inner diameter side arc magnet 821) located on one side in the circumferential direction with respect to the d-axis, and a second arc magnet (second inner diameter side arc magnet 822) located on the other side in the circumferential direction with respect to the d-axis, an arc center (arc center C21) of the first arc magnet is located on the other side in the circumferential direction with respect to the d-axis, an arc center (arc center C22) of the second arc magnet is located on one side in the circumferential direction with respect to the d-axis, and in a front view of the rotor core, the refrigerant flow path hole is provided in a region (region S) surrounded by a first virtual line (first virtual line L1) connecting a d-axis side end surface (d-axis side end surface 821D) of the first arc magnet and the arc center of the first arc magnet, a second virtual line (second virtual line L2) connecting a d-axis side end surface (d-axis side end surface 822D) of the second arc magnet and the arc center of the second arc magnet, an arc-shaped first extension line (first extension line E1) extending along an inner peripheral surface (inner peripheral surface 821N) of the first arc magnet, and an arc-shaped second extension line (second extension line E2) extending along an inner peripheral surface (inner peripheral surface 822N) of the second arc magnet.

According to (2), since the refrigerant flow path hole is provided in a region surrounded by, in a front view of the rotor core, a first virtual line connecting the d-axis side end surface of the first arc magnet and the arc center of the first arc magnet, a second virtual line connecting the d-axis side end surface of the second arc magnet and the arc center of the second arc magnet, an arc-shaped first extension line extending along the inner circumferential surface of the first arc magnet, and an arc-shaped second extension line extending along the inner peripheral surface of the second arc magnet, narrowing of the magnetic path of the magnetic flux by the pair of inner diameter side arc magnets is suppressed by the refrigerant flow path hole. Accordingly, the refrigerant flow path hole can be provided between the outer diameter side magnet portion and the inner diameter side magnet portion without lowering the output performance of the rotating electrical machine.

(3) In the rotor of the rotating electrical machine according to (2), the refrigerant flow path hole includes a first side wall portion (first side wall portion 91) extending along the first virtual line and a second side wall portion (second side wall portion 92) extending along the second virtual line.

According to (3), since, in the refrigerant flow path hole, the first side wall portion extends along the first virtual line and the second side wall portion extends along the second virtual line, the circumferential length of the refrigerant flow path hole can be maximized within a range in which the magnetic path of the magnetic flux by the pair of inner diameter side arc magnets is not narrowed. In addition, due to the refrigerant flow path hole, both the circumferential outer sides near the d-axis side end surfaces of the pair of inner diameter side arc magnets are formed of gaps. Therefore, the sneak magnetic flux in the vicinity of the d-axis side end surface of the pair of inner diameter side arc magnets can be reduced.

(4) In the rotor of the rotating electrical machine according to (3), an intersection (intersection X) of the first virtual line and the second virtual line is located between the outer diameter side magnet portion and the inner diameter side magnet portion, and the refrigerant flow path hole has a shape in which the first side wall portion and the second side wall portion extend from an outer diameter side apex portion (outer diameter side apex portion 90T) with the intersection being the outer diameter side apex portion.

According to (4), since the outer diameter side apex portion of the refrigerant flow path hole is located at the intersection of the first virtual line and the second virtual line, the refrigerant flow path hole can be arranged on the outermost radial side within a range where the magnetic path of the magnetic flux by the pair of inner diameter side arc magnets is not narrowed. Therefore, since the refrigerant can be supplied to the outermost radial side between the outer diameter side magnet portion and the inner diameter side magnet portion within the range where the magnetic path of the magnetic flux by the pair of inner diameter side arc magnets is not narrowed, the outer diameter side magnet portion can be cooled more effectively.

(5) In the rotor of the rotating electrical machine according to (3), the refrigerant flow path hole includes an arc-shaped outer diameter side wall portion (outer diameter side wall portion 94) protruding inward in the radial direction.

According to (5), since the refrigerant flow path hole includes the arc-shaped outer diameter side wall portion which protrudes radially inward, even when the width of the q-axis magnetic path formed between the outer diameter side magnet insertion hole and the pair of inner diameter side magnet insertion holes increases due to rotor core manufacturing errors, it is possible to prevent the q-axis inductance from decreasing. Moreover, stress concentration on the radially outer side of the refrigerant flow path hole due to the centrifugal force during rotation of the rotor can be alleviated.

(6) In the rotor of the rotating electrical machine according to any one of (1) to (5), the outer diameter side magnet portion, the inner diameter side magnet portion, and the refrigerant flow path hole are symmetric with respect to the d-axis.

According to (6), since the outer diameter side magnet portion, the inner diameter side magnet portion, and the refrigerant flow path hole are symmetric with respect to the d-axis, an efficient arrangement for obtaining reluctance torque can be obtained.

(7) In the rotor of the rotating electrical machine according to any one of (1) to (6), the at least one arc magnet of the outer diameter side magnet portion is constituted of one arc magnet (outer diameter side arc magnet 810) having an arc center (arc center C10) on the d-axis.

According to (7), since at least one arc magnet of the outer diameter side magnet portion is constituted of one arc magnet having the arc center on the d-axis, the inner diameter side magnet portion which can efficiently obtain magnet torque with a simple structure can be configured.

(8) In the rotor of the rotating electrical machine according to any one of (1) to (7), a distance between the arc magnet of the inner diameter side magnet portion and the arc magnet of the outer diameter side magnet portion becomes wider as it approaches the d-axis.

According to (8), the distance between the arc magnet of the inner diameter side magnet portion and the arc magnet of the outer diameter side magnet portion becomes wider as it approaches from the q-axis to the d-axis. Accordingly, since it can suppress that the circumferential length of the magnetic pole portion becomes large, it can suppress that the rotor enlarges. In addition, since the q-axis magnetic path can be widened, the reluctance torque of the rotating electrical machine can be increased. Furthermore, since the magnetic flux generated by the arc magnet of the inner diameter side magnet portion and the arc magnet of the outer diameter side magnet portion is easily concentrated on the d-axis, the magnet torque of the rotating electrical machine can be used efficiently.

(9) In the rotor of the rotating electrical machine according to any one of (1) to (8), in each arc magnet, an inner peripheral surface and an outer peripheral surface have the same arc center (arc centers C10, C21, and C22), a plate thickness (plate thicknesses d10, d21, and d22) of the arc magnet is larger in the inner diameter side magnet portion than in the outer diameter side magnet portion, and an arc radius (arc radius r10, r21, and r22) of the arc magnet is larger in the inner diameter side magnet portion than in the outer diameter side magnet portion.

According to (9), the plate thickness and the arc radius of the arc magnet are larger in the inner diameter side magnet portion than in the outer diameter side magnet portion. That is, the arc radius of the arc magnet can be increased by the amount that the plate thickness of the arc magnet of the inner diameter side magnet portion is larger than the plate thickness of the arc magnet of the outer diameter side magnet portion. Therefore, when increasing the number of magnets in each magnetic pole portion, it is possible to use the arc magnets having high-performance magnetization characteristics, and thus the output performance of the rotating electrical machine can be improved.

The invention claimed is:

1. A rotor of a rotating electrical machine, comprising:
a rotor core;
a plurality of magnetic pole portions arranged along a circumferential direction; and
a plurality of arc magnets constituting the magnetic pole portions, wherein
each magnetic pole portion includes a magnet portion of at least two layers along a radial direction,
the magnet portion includes:
an outer diameter side magnet portion including at least one of the arc magnets arranged to protrude inward in the radial direction; and
an inner diameter side magnet portion including at least a pair of the arc magnets arranged to protrude inward in the radial direction,
when a central axis of each of the magnetic pole portions is set as a d-axis and an axis separated by 90° in electrical angle from the d-axis is set as a q-axis, the rotor core includes in a front view:

an outer diameter side magnet insertion hole into which the at least one of the arc magnets constituting the outer diameter side magnet portion is inserted;

an inner diameter side magnet insertion hole into which the at least one pair of the arc magnets constituting the inner diameter side magnet portion is inserted, and a refrigerant flow path hole provided between the outer diameter side magnet portion and the inner diameter side magnet portion to overlap the d-axis, and a minimum width of a magnetic path formed between the outer diameter side magnet insertion hole and the refrigerant flow path hole is equal to or larger than a minimum width of a magnetic path formed between the outer diameter side magnet insertion hole and the inner diameter side magnet insertion hole.

2. The rotor of the rotating electrical machine according to claim 1, wherein the pair of the arc magnets of the inner diameter side magnet portion includes:

a first arc magnet located on one side in the circumferential direction with respect to the d-axis; and a second arc magnet located on the other side in the circumferential direction with respect to the d-axis, an arc center of the first arc magnet is located on the other side in the circumferential direction with respect to the d-axis, an arc center of the second arc magnet is located on one side in the circumferential direction with respect to the d-axis, and in the front view of the rotor core, the refrigerant flow path hole is provided in a region surrounded by a first virtual line connecting a d-axis side end surface of the first arc magnet and the arc center of the first arc magnet, a second virtual line connecting a d-axis side end surface of the second arc magnet and the arc center of the second arc magnet, an arc-shaped first extension line extending along an inner peripheral surface of the first arc magnet, and an arc-shaped second extension line extending along an inner peripheral surface of the second arc magnet.

3. The rotor of the rotating electrical machine according to claim 2, wherein the refrigerant flow path hole includes a first side wall portion extending along the first virtual line and a second side wall portion extending along the second virtual line.

4. The rotor of the rotating electrical machine according to claim 3, wherein an intersection of the first virtual line and the second virtual line is located between the outer diameter side magnet portion and the inner diameter side magnet portion, and the refrigerant flow path hole has a shape in which the first side wall portion and the second side wall portion extend from an outer diameter side apex portion with the intersection being the outer diameter side apex portion.

5. The rotor of the rotating electrical machine according to claim 3, wherein the refrigerant flow path hole includes an arc-shaped outer diameter side wall portion protruding inward in the radial direction.

6. The rotor of the rotating electrical machine according to claim 1, wherein the outer diameter side magnet portion, the inner diameter side magnet portion, and the refrigerant flow path hole are symmetric with respect to the d-axis.

7. The rotor of the rotating electrical machine according to claim 1, wherein at least one arc magnet of the outer diameter side magnet portion is constituted of one arc magnet having an arc center on the d-axis.

8. The rotor of the rotating electrical machine according to claim 1, wherein a distance between the arc magnet of the inner diameter side magnet portion and the arc magnet of the outer diameter side magnet portion becomes wider as it approaches the d-axis.

9. The rotor of the rotating electrical machine according to claim 1, wherein in each arc magnet, an inner peripheral surface and an outer peripheral surface have the same arc center, a plate thickness of the arc magnet is larger in the inner diameter side magnet portion than in the outer diameter side magnet portion, and an arc radius of the arc magnet is larger in the inner diameter side magnet portion than in the outer diameter side magnet portion.

* * * * *